(12) United States Patent
Frers

(10) Patent No.: US 11,336,979 B2
(45) Date of Patent: May 17, 2022

(54) MOTOR-VEHICLE VOICE-ASSISTANCE APPARATUS

(71) Applicant: PARAGON GMBH & CO. KGAA, Delbrück (DE)

(72) Inventor: Klaus Dieter Frers, Delbrueck (DE)

(73) Assignee: paragon GmbH & CO KGAA, Delbrueck (DE)

( * ) Notice: Subject to any disclaimer, the term of this patent is extended or adjusted under 35 U.S.C. 154(b) by 0 days.

(21) Appl. No.: 17/046,128

(22) PCT Filed: Feb. 19, 2019

(86) PCT No.: PCT/EP2019/000051
§ 371 (c)(1),
(2) Date: Oct. 8, 2020

(87) PCT Pub. No.: WO2019/201467
PCT Pub. Date: Oct. 24, 2019

(65) Prior Publication Data
US 2021/0037302 A1  Feb. 4, 2021

(30) Foreign Application Priority Data

Apr. 18, 2018 (DE) .......................... 102018003190.0

(51) Int. Cl.
*G06F 3/16* (2006.01)
*H04R 1/02* (2006.01)

(52) U.S. Cl.
CPC ............. *H04R 1/028* (2013.01); *G06F 3/167* (2013.01); *H04R 2499/13* (2013.01)

(58) Field of Classification Search
CPC ...... H04R 1/028; H04R 2499/13; G06F 3/167
See application file for complete search history.

(56) References Cited

U.S. PATENT DOCUMENTS

| 7,974,431 | B2 | 5/2011 | Saiki |
| 9,667,906 | B2 | 5/2017 | Yeo |
| 9,688,147 | B1 | 6/2017 | Koch |
| 2004/0246607 | A1* | 12/2004 | Watson ..................... B60R 1/12 359/872 |
| 2009/0097691 | A1* | 4/2009 | Eaton ..................... G06F 1/1688 381/388 |
| 2012/0045072 | A1 | 2/2012 | Matsuda |
| 2013/0028457 | A1* | 1/2013 | Yeh .......................... H04R 1/10 381/334 |

(Continued)

FOREIGN PATENT DOCUMENTS

DE  202012006914 U  9/2012

*Primary Examiner* — Joseph Saunders, Jr.
(74) *Attorney, Agent, or Firm* — Andrew Wilford

(57) ABSTRACT

A voice assistance device (1) for motor vehicles, which can be arranged in the interior of the motor vehicle, has a display (2), which is configured on the front of the voice assistance device (1), at least one microphone (3), which is disposed in or on the display (2), and a loudspeaker, by means of which audio signals of the voice assistance device (1) can be output into the interior of the motor vehicle. In order to achieve the best possible sound in the interior of the motor vehicle, the invention proposes that the loudspeaker has a sound outlet opening (4) which is arranged on the front side of the voice assistance device (1) comprising the display (2) and the microphone (3).

4 Claims, 1 Drawing Sheet

(56) References Cited

U.S. PATENT DOCUMENTS

2014/0044286 A1* 2/2014 Coles ..................... H04R 1/028
  381/150
2018/0299288 A1* 10/2018 Herbst ............... G01C 21/3608

* cited by examiner

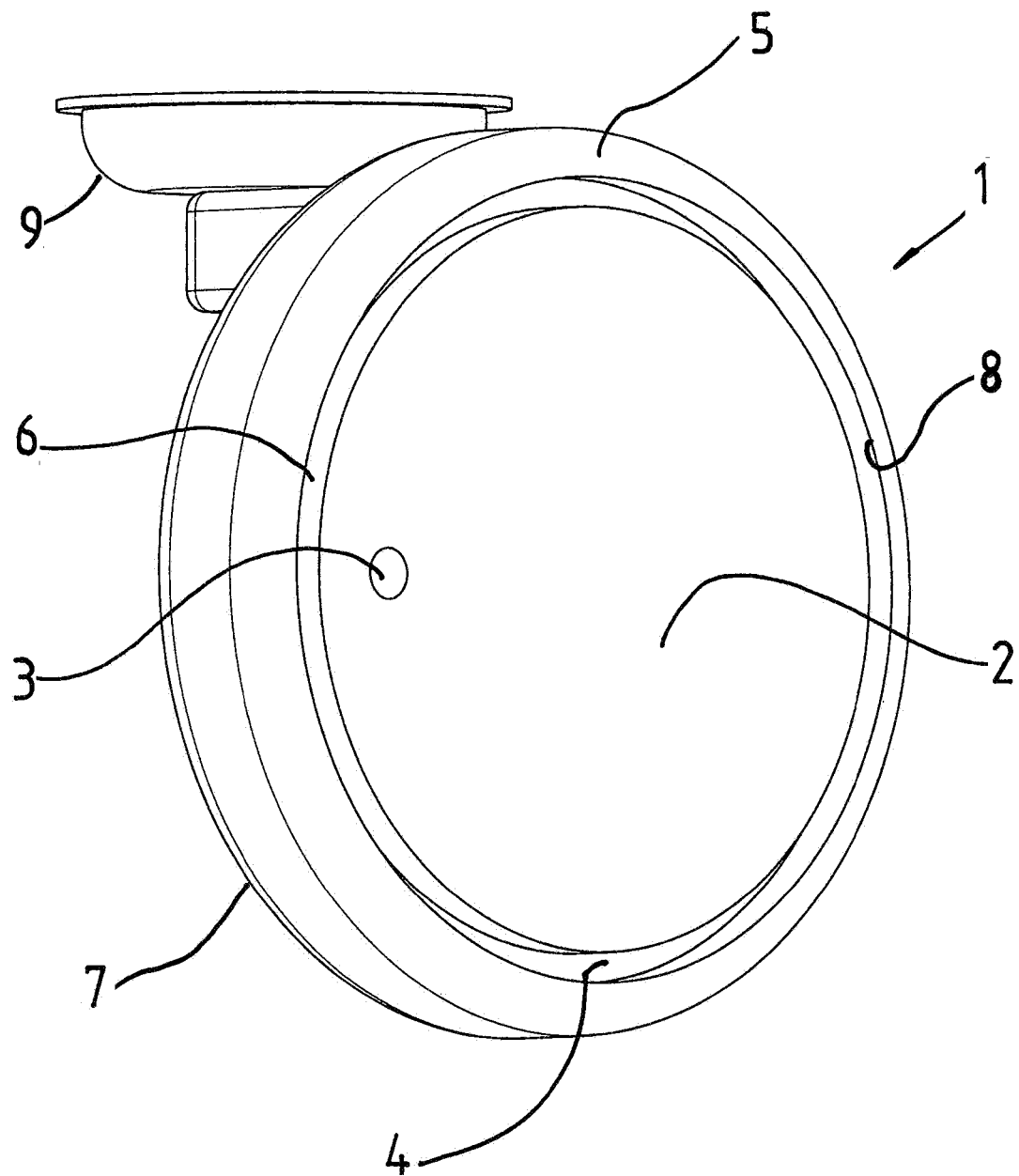

MOTOR-VEHICLE VOICE-ASSISTANCE APPARATUS

CROSS REFERENCE TO RELATED APPLICATIONS

This application is the US-national stage of PCT application PCT/EP2019/000051 filed 19 Feb. 2019 and claiming the priority of German patent application 102018003790.1 itself filed 18 Apr. 2018.

FIELD OF THE INVENTION

The invention relates to a voice-assistance apparatus for motor vehicles for use inside a motor vehicle.

BACKGROUND OF THE INVENTION

Such an apparatus typically has a display screen on a front side of the voice-assistance apparatus, at least one microphone in or on the display screen, and a speaker that can output audio signals from the voice-assistance apparatus into the interior of the motor vehicle.

A disadvantage of voice-assistance apparatuses for motor vehicles of this kind that are known in the art is that the quality of the sound projected into the interior of the motor vehicle is comparatively low.

OBJECT OF THE INVENTION

Based on the prior art described above, the object addressed by the invention is to develop the voice-assistance apparatus for motor vehicles described above in such a manner that it projects substantially higher-quality sound in the interior of the motor vehicle.

SUMMARY OF THE INVENTION

This object is attained according to the invention in that the speaker of the voice-assistance apparatus has a sound outlet opening on a front side of the voice-assistance apparatus carrying the display screen and the microphone. In this way, if the front side of the voice-assistance apparatus is aimed into the interior of the motor vehicle, as is customary, high-quality sound is guaranteed in the interior of the motor vehicle.

In order to allow comfortable actuation of the touch-sensitive video screen, it is advantageous for the sound outlet opening of the speaker to be closer to the outer edge of the front side of the voice-assistance apparatus than the display screen, or the microphone provided in or on the display screen.

According to a particularly advantageous development of the voice-assistance apparatus according to the invention, the sound outlet opening of the speaker is arranged in such a manner that it surrounds the video screen and the microphone.

According to an advantageous development of the voice-assistance apparatus according to the invention, the sound outlet opening of the speaker occupies the entire, or virtually the entire, surface portion of the front side of the voice-assistance apparatus between the outer edge of the display screen, including the microphone, on the one hand, and the outer edge of the front face of the voice-assistance apparatus, on the other.

Insofar as the front side of the voice-assistance apparatus is round in design and the sound outlet opening of the speaker forms a circular ring of the front side face of the voice-assistance apparatus, the voice-assistance apparatus according to the invention can be designed in an aesthetically pleasing form, and the speaker ensures both the user friendliness of the display screen and the radiation of acoustic signals with outstanding quality.

Advantageously, the voice-assistance apparatus according to the invention has an electronic analog-digital converter that can suppress possible disturbances, interference, etc. during operation of the microphone and the speaker or that can exclude the speaker's useful signal from the microphone signal.

The voice-assistance apparatus according to the invention is advantageously contained in a housing whose inner edge assigned to the front side of the voice-assistance apparatus outwardly delimits the sound outlet opening of the speaker.

BRIEF DESCRIPTION OF THE DRAWING

In the following, the invention is explained in greater detail with the help of an embodiment making reference to the drawing whose sole FIGURE is a perspective view of an embodiment of a motor-vehicle voice-assistance apparatus according to the invention.

SPECIFIC DESCRIPTION OF THE INVENTION

An embodiment of a motor-vehicle voice assistance apparatus 1 shown in the single FIGURE is in the interior of a motor vehicle that is not otherwise shown. In the case of the embodiment of the voice-assistance apparatus according to the invention shown in FIG. 1, said voice-assistance apparatus is provided with a mount 9 that for example holds the voice-assistance apparatus 1 inside a windscreen of the motor vehicle.

The embodiment of the voice-assistance apparatus 1 shown in the drawing includes a display screen 2 on or forming the front side of the voice-assistance apparatus 1, a microphone 3 within the area of the front side of the voice-assistance apparatus 1 occupied by the display screen 2 in the illustrated embodiment of the voice-assistance apparatus according to the invention, and a speaker that cannot be seen in the drawing, that can emit audio signals from the voice-assistance apparatus 1 into the interior of the motor vehicle.

It should be noted that more than one microphone 3 may also be provided in different embodiments of the voice-assistance apparatus according to the invention.

As shown in the perspective view of the voice-assistance apparatus 1, a sound outlet opening 4 of the speaker is on the front side of the speech assistant device 1. The sound outlet opening 4 is therefore arranged or configured along with the display screen 2 and the microphone 3 on the front side of the voice-assistance apparatus according to the invention shown in the single FIGURE.

An outer edge 5 of the embodiment of the voice-assistance apparatus 1 according to the invention shown in the single FIGURE is formed by an inner edge 8 of a housing 7 of the voice-assistance apparatus 1. The inner edge 8 of the housing 7 outwardly delimits the sound outlet opening 4 of the speaker of the voice-assistance apparatus 1 that is not shown in the drawing on the front side thereof.

In the illustrated embodiment, the sound outlet opening 4 of the speaker of the voice-assistance apparatus 1 is configured in the form of a radially outer circular ring 6 of the front-side face of the voice-assistance apparatus 1.

This circular ring 6 forming the sound outlet opening 4 surrounds the circular display screen 2 on which the microphone 3 is provided.

The sound outlet opening 4 of the speaker of the voice-assistance apparatus 1 therefore surrounds the display screen 2 on the front side of the voice-assistance apparatus 1.

In order to guarantee interference-free operation of the voice-assistance apparatus 1, the apparatus is equipped with an electronic analog-digital converter that is not shown in the drawing. This analog-digital converter can suppress or balance possible disturbances, interference, etc. during operation of the microphone 3 and the speaker by excluding a useful signal of the speaker from the microphone signal.

The invention claimed is:

1. A motor-vehicle voice-assistance apparatus for use inside a motor vehicle, the apparatus comprising:
   a housing having a front side directed into an interior of the vehicle and having an outer edge;
   a display screen on the front side of the housing and having an outer edge spaced inward from the outer edge of the housing;
   a microphone in or on the display screen inside the outer edge of the display screen; and
   a speaker that can output audio signals from the voice-assistance apparatus into the interior of the motor vehicle, the speaker having an annular sound-outlet opening on the front side, defined and filling a space between the outer edge of the display screen and the outer edge of the front side, directed like the display screen into the interior of the vehicle, and surrounding the display screen and the microphone.

2. The voice-assistance apparatus according to claim 1, wherein the front side of the housing is circular and the sound outlet opening of the speaker is a circular ring on the front side of the voice-assistance apparatus extending between the outer edge of the display screen and the outer edge of the housing.

3. The voice-assistance apparatus according to claim 1, further comprising;
   an electronic analog-digital converter for suppressing disturbances and interference during operation of the microphone and the speaker or excluding the speaker's useful signal from the microphone signal.

4. The voice-assistance apparatus according to claim 1, wherein the housing has an inner edge on the front side of the voice-assistance apparatus that outwardly delimits the sound outlet opening of the speaker.

\* \* \* \* \*